(12) United States Patent
Foster et al.

(10) Patent No.: US 7,934,010 B2
(45) Date of Patent: Apr. 26, 2011

(54) SYSTEM AND METHOD FOR RETRIEVING DIGITAL MULTIMEDIA CONTENT FROM A NETWORK NODE

(75) Inventors: Michael Foster, San Diego, CA (US); Michael Severa, Pasadena, CA (US); P. Greg Sherwood, San Diego, CA (US); David Kosiba, Jamul, CA (US); Wei Wu, San Diego, CA (US); Cheuk Chan, La Jolla, CA (US); Thomas Zeng, San Diego, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 398 days.

(21) Appl. No.: 10/598,551

(22) PCT Filed: Mar. 3, 2005

(86) PCT No.: PCT/US2005/007169
§ 371 (c)(1),
(2), (4) Date: Sep. 5, 2006

(87) PCT Pub. No.: WO2005/086016
PCT Pub. Date: Sep. 15, 2005

(65) Prior Publication Data
US 2007/0186003 A1 Aug. 9, 2007

(51) Int. Cl.
*G06F 15/16* (2006.01)
(52) U.S. Cl. .......................... 709/231; 709/230
(58) Field of Classification Search .................. 709/230, 709/231
See application file for complete search history.

(56) References Cited

U.S. PATENT DOCUMENTS

| | | | |
|---|---|---|---|
| 6,195,680 B1 * | 2/2001 | Goldszmidt et al. | 709/203 |
| 6,763,392 B1 * | 7/2004 | del Val et al. | 709/231 |
| 2003/0236905 A1 * | 12/2003 | Choi et al. | 709/231 |
| 2004/0003101 A1 * | 1/2004 | Roth et al. | 709/231 |
| 2005/0071881 A1 * | 3/2005 | Deshpande | 725/88 |
| 2005/0254526 A1 * | 11/2005 | Wang et al. | 370/503 |
| 2005/0259947 A1 * | 11/2005 | Wang et al. | 386/46 |
| 2006/0090187 A1 * | 4/2006 | Chae et al. | 725/100 |
| 2007/0143490 A1 * | 6/2007 | Gallou et al. | 709/231 |
| 2008/0151885 A1 * | 6/2008 | Horn et al. | 370/389 |

OTHER PUBLICATIONS

Authors: H. Schulzrinne, A. Rao, R. Lanphier, M. Westerlund, Title: Real Time Streaming Protocol (RTSP); draft-ietf-mmusic-rfc2326bis-03; draft-ietf-mmusic-rfc2326bis-04, Date: Mar. 3, 2003, Publisher: Pertinent Pages.*
Author: Mohamed Hefeeda, Ahsan Habib, Boyan Botev, Dongyan Xu, Bharat Bhargava Title: Promise: PeertoPeer Media Streaming Using CollectCast Date: Nov. 2-8, 2003 Pertinent pp. 1-10.*

(Continued)

*Primary Examiner* — Joseph E Avellino
*Assistant Examiner* — Marshall McLeod
(74) *Attorney, Agent, or Firm* — Galasso & Associates

(57) ABSTRACT

A scheme for retrieving digital multimedia content from a network node. An RTSP SET_PARAMETER message is provided to the network node by a client application executing on a digital multimedia device, wherein the message contains at least one of a playlist identifier, a media clip index and an indication of an activation time. Responsive to the message, content from a particular content source identified by the playlist identifier, the media clip index, or both, is streamed to the digital multimedia device at a time determined responsive to the activation time.

8 Claims, 8 Drawing Sheets

OTHER PUBLICATIONS

Philippe Gentric: "RTSPStream Switching . . . ";Jan. 1, 2004; XP002324459; URL: ftp.faqs.org/internet-drafts/draft-gentric-mmusic-stream.

Apple Computer et al: Interactive Movies; Oct. 1, 2002; XP002478048; http://developer.apple.com/documentation/QuickTime/IQ_InteractiveMovies/isideqt_intmov.pdf>.

Microsoft: Windows Media Services9 Series in Windows Server 2003.; Apr. 22, 2003; XP002384215; http://download.microsoft.com/download/7/8/0/78000026e-3785-4cd8-be29-ac20371d12f8.

US2002/141740 A1 (Matsui Yoshinori [JP]); Oct. 3, 2002.

* cited by examiner

CLIENT REQUEST

```
SET_PARAMETER rtsp://example.com/public/foo RTSP/1.0
CSeq: 7
Session: 1234567890
Content-length: 40
Content-type: text/parameters
playlist_url: /public/foo/foo1.ply
clip_index:   8
clip_offset:  0
activate: End Of Clip
```
— 702

STREAMING MODULE RESPONSE

```
RTSP/1.0 200 OK
CSeq: 7
Session: 1234567890
Content-length: 24
Content-type: text/parameters
playlist_url: /public/foo/foo1.ply
clip_index:   8
clip_offset:  0
clip_ts: 65000
```
— 704

STREAMING MODULE SET_PARAMETER REQUEST

```
SET_PARAMETER rtsp://example.com/public/foo RTSP/1.0
CSeq: 8
Session: 1234567890
Content-length: 24
Content-type: text/parameters playlist_play_time=</foo1.ply, 6, 0>
presentation_npt_time: 65000
```
— 706

CLIENT RESPONSE

```
RTSP/1.0 200 OK
CSeq: 8
Session: 1234567890
```
— 708

FIG. 7

SYSTEM AND METHOD FOR RETRIEVING DIGITAL MULTIMEDIA CONTENT FROM A NETWORK NODE

BACKGROUND OF THE INVENTION

1. Technical Field of the Invention

The present invention generally relates to media streaming over a network. More particularly, and not by way of any limitation, the present invention is directed to a system and method for retrieving digital multimedia content from a network node in a client-server architecture.

2. Description of Related Art

With today's widespread use of the Internet as a major communication medium, computer networks are increasingly being used to transmit multimedia data (e.g., audio, full-motion video, pictures, et cetera). In the network-based context, one simple model of producing the information involves a client device requesting the downloading of the multimedia data from a server. Once downloaded, the client may then consume, or present, the information. This model is relatively easy to implement; however, it is non-optimal in that the client is required to wait for the downloading to complete before the presentation can begin. This delay can be considerable where large blocks of multimedia data are involved.

A more sophisticated model of producing information involves a content server at one network site "streaming" the multimedia information over the network to a client at another site. Streaming is a process in which packets, sent over an Internet Protocol (IP)-based network, are used to present material continuously to a recipient client as it arrives in substantially real time as perceived by the user. As such the client does not have to download and store a large file before displaying the material. That is, the client begins to present the information as it arrives (i.e., just-in-time rendering), rather than waiting for the entire data set to arrive before beginning presentation. Accordingly, at the client device, received data is buffered into a cache memory and continuously processed as soon as, or soon after, being received by the client for real time presentation of multimedia content.

Most streaming sessions include either live or video-on-demand (VOD) sources, and are typically associated with a single content source (i.e., a single VOD file or a single live source, e.g., a video camera). However, by adding the ability to combine sources into a single streaming session, much richer applications can be built based on multimedia streaming.

A "playlist" in its simplest form is just a list of media which could be used to simply manage playback of local content (i.e., audio files) or to control the streaming media sessions. When used in the context of multimedia streaming, playlists provide an extensible, dynamic method for delivering customizable audio and video content to users via streaming. A playlist represents a list of the media items that a server can stream to a client, which can include a mixture of program content and advertisements (ads), for example. Also, a playlist can be used to play several short clips or to provide a user with long blocks of programming.

In a client-server streaming architecture, two types of playlists may be provided: client-side playlists and server-side playlists. The main difference between the two types of playlists is that when the client-side playlists are used, a client player application has control of the streaming experience, whereas when server-side playlists are used, a streaming server has control of the streaming experience. Server-side playlists provide the ability for the streaming server to combine streams from multiple sources (in sequence) and stream to a client in a single session. The client need not (and may not even) be aware that there are multiple media sources. This is useful for providing ad insertion capability, or for applications where uninterrupted streaming (from multiple sources) is desired—i.e., where the client doesn't have to explicitly request streaming from each new source.

One of the issues when utilizing server-side playlists is to support dynamic playlist navigation, which is advantageous in providing the end-user with a compelling and useful user experience. Additionally, the playlist navigation functionality must be accomplished with minimal impact on the client device application due to significant client device resource constraints. Existing server-side playlist schemes, however, are deficient in that they do not support client-side navigational control of playlist seeking.

SUMMARY OF THE INVENTION

In one aspect, the present invention is directed to a method for retrieving digital multimedia content from a network node, comprising: generating a Real Time Streaming Protocol (RTSP) SET_PARAMETER message to the network node by a client application executing on a digital multimedia device, the message containing at least one of a playlist identifier, a media clip index and a clip offset as well as an indication of an activation time; and transferring digital multimedia content to the digital multimedia device by the network node from a particular content source identified by at least one of the playlist identifier and the media clip index, the transferring commencing at a time determined responsive to the indication of the activation time.

In another aspect, the present invention is directed to a system for retrieving digital multimedia content from a network node, comprising: means associated with a client application executing on a digital multimedia device for generating an RTSP SET_PARAMETER message to the network node, the message containing at least one of a playlist identifier, a media clip index and a clip offset as well as an indication of an activation time; and means for transferring digital multimedia content to the digital multimedia device by the network node from a particular content source identified by at least one of the playlist identifier and the media clip index, the transferring commencing at a time determined responsive to the indication of the activation time.

In yet another aspect, the present invention is directed to a digital multimedia device operable to retrieve digital multimedia content from a network node, comprising: logic for generating an RTSP SET_PARAMETER message to the network node by a client application executing on the digital multimedia device, the message containing at least one of a playlist identifier, a media clip index and a clip offset as well as an indication of an activation time; and a player engine operable to play back streaming content from a particular content source identified by at least one of the playlist identifier and the media clip index, the streaming content commencing at a time determined responsive to the indication of the activation time.

In a further aspect, the present invention is directed to a network node operable to stream digital multimedia content to a digital multimedia device, comprising: a depository of digital multimedia content organized into an arbitrary number of playlists, each playlist including at least one media clip; logic for processing an RTSP SET_PARAMETER message transmitted to the network node by a client application executing on the digital multimedia device, the message containing at least one of a playlist identifier, a media clip index and a clip offset as well as an indication of an activation time; and logic for streaming content to the digital multimedia device from a particular content source identified by at least one of the playlist identifier and the media clip index, the streaming content commencing at a time determined responsive to the indication of the activation time.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

FIG. 7 depicts request/response syntax structure associated with an exemplary SET_PARAMETER procedure according to an embodiment of the present invention.

DETAILED DESCRIPTION OF THE DRAWINGS

Figure 1:
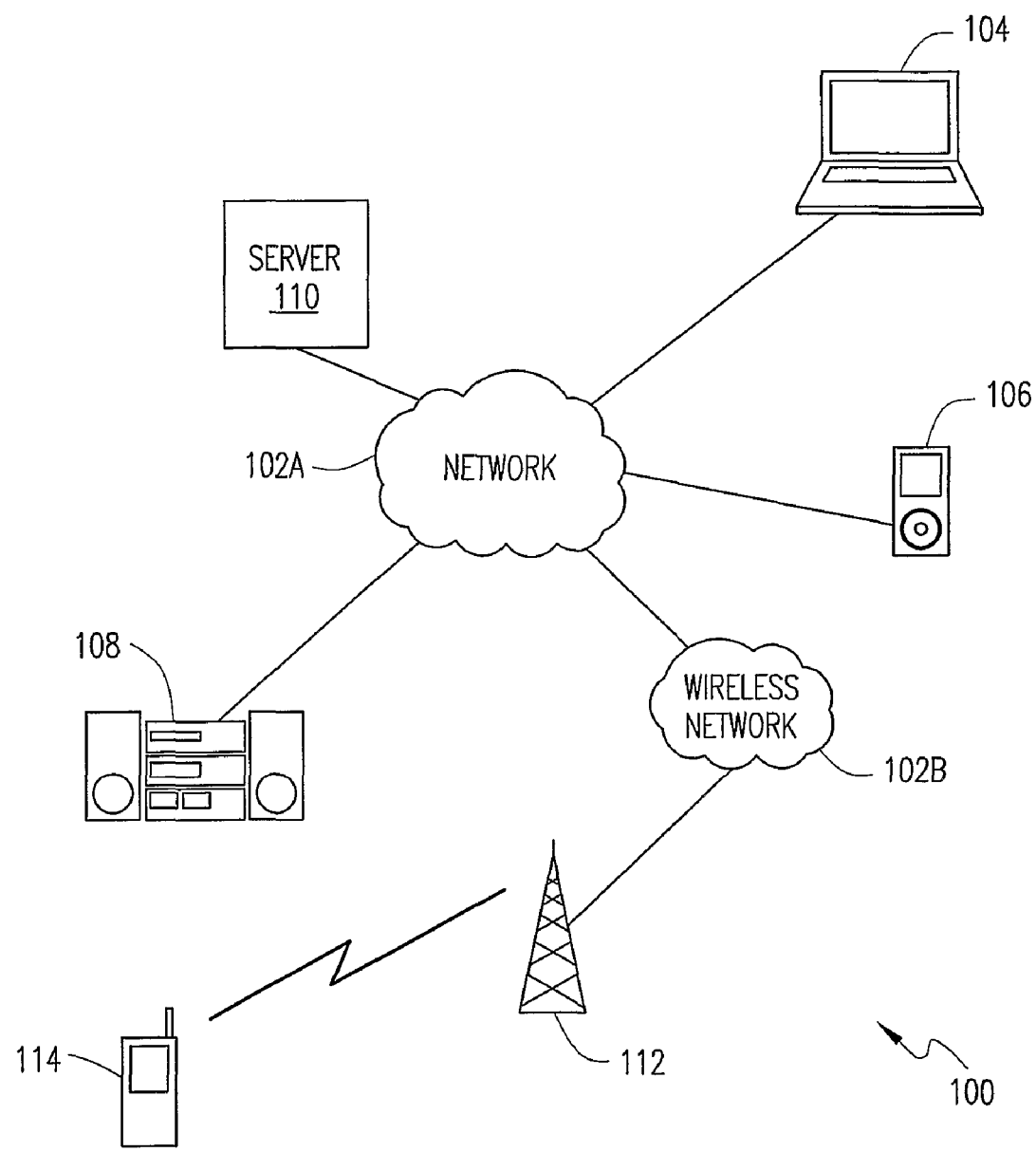
FIG. 1 depicts an exemplary network environment in which an embodiment of the present invention may be practiced.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 in which an embodiment of the present invention may be practiced. Reference numerals 102A and 102B are illustrative of a network infrastructure that can include, among others, any wireline, wireless, satellite, or cable network arrangement, or a combination thereof, that can support transfer of digital multimedia content from a server node 110 to various client devices capable of accepting such content over a client-server network architecture. In one implementation, network 102A may comprise a public packet-switched network such as the Internet that is accessible via suitable access means including both narrowband (e.g., dial-up) and broadband (e.g., cable, digital subscriber line or DSL, etc.) access mechanisms. Alternatively, network 102A may be implemented as a private enterprise-level intranet. Wireless network 102B may be implemented as a wireless packet data service network such as the General Packet Radio Service (GPRS) network that provides a packet radio access for mobile devices using the cellular infrastructure of a Global System for Mobile Communications (GSM)-based carrier network. In still further implementations, the wireless network 102B may comprise any known or heretofore unknown $3^{rd}$ Generation Partnership Project (i.e., 3GPP, 3GPP2, etc.) network operable to serve Internet Protocol (IP)-capable handheld devices, e.g., a mobile client device 114, using appropriate wireless infrastructure 112 that includes, among others, short-range wireless fidelity (WiFi) access points (APs) or "hot spots." As will be seen hereinbelow, the embodiments of the present patent application for retrieving server-based digital multimedia content by a client device will be described regardless of any particular wireless or wireline network implementation of the networks 102A, 102B.

Although the server node 110 is illustrated as a single node coupled to the network 102A, its functionality may be distributed among a plurality of nodes depending on the underlying streaming media architecture. Exemplary client devices can be thick or thin clients, with varying levels of processing power, operable execute appropriate streaming client applications that can include Java applications, plug-ins, etc. Client devices may comprise portable computers, laptops, handheld computers, desktop computers, generically represented as computers 104, network-aware audio/video (A/V) devices such as digital music players, digital video players, etc., generally represented as A/V components 108, or specialized multimedia devices 106 such as iPod™ devices and the like. Further, as alluded to before, client devices can also include mobile client devices (e.g., device 114) that are capable of accepting and playing digital multimedia content.

Figure 2:
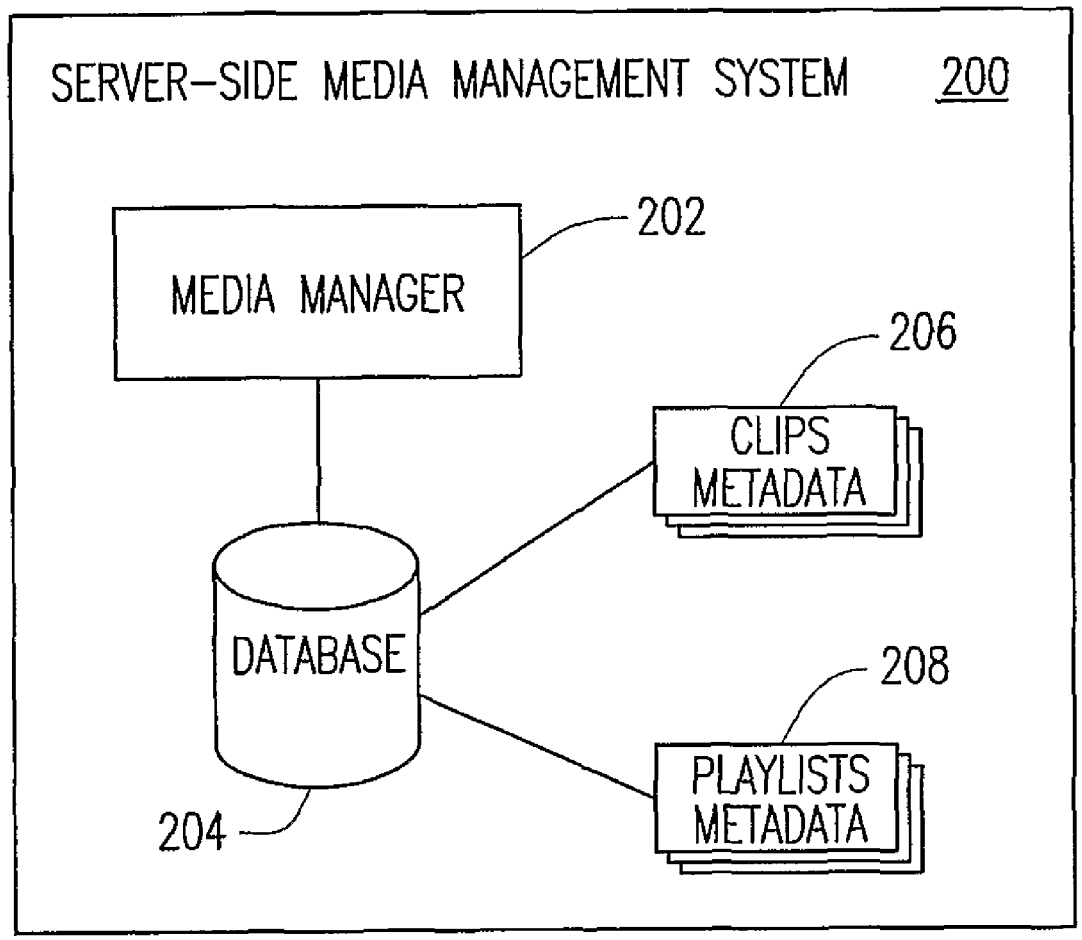
FIG. 2 depicts an exemplary embodiment of a server-side media management system operable in accordance with an embodiment of the present invention.

FIG. 2 depicts an exemplary embodiment of a server-side media management system 200 associated with a server (e.g., the server node 110) in accordance with an embodiment of the present invention. The server-side media management system 200 may include a media manager 210 and a digital multimedia content database 204 wherein the media manager 210 controls access to the database 204. In one implementation, the media manager 210 receives requests from a client application executing on a digital multimedia device, accesses the content database, and returns responses to the client application. Preferably, the database 204 serves as a depository of digital multimedia content that is organized based on parameters that are used to classify, identify and/or describe media (i.e., media items) in the database 204. For instance, the digital multimedia content associated with the server may contain music files that can be streamed over the network under control of a suitable text-based protocol such as the Real-Time Streaming Protocol (RTSP). It should be appreciated that other media files may comprise any form of digital media, which can include sound files, picture data, movies, text files or any other types of media that can be digitally stored on a computer. Accordingly, server-side playlists can be generalized to media collections, including collections of mixed digital media, each playlist including one or more individual multimedia files or clips. The media manager 202 has or can obtain information about the database 204 that may, for example, include the name of the server, the version of the database being used, the type of security that is required, the number of databases available to the server, whether non-standard media types are supported, whether persistent identification is supported, etc. Those skilled in the art should appreciate that the information about the database 204 may exist in a single record file or can be either partially or fully generated on demand, identifying the various pieces of information as needed. One or more metadata files 206 contain metadata about each media item available in the database 204. By way of illustration, where the media item is a song, the metadata might include, for example, the names or titles of songs, an identification number, a persistent identification number, the artist, the album, the size of the song, the format of the song, the required bit rate, and any other appropriate information, which may depend on the type of media. A video file might have additional fields, e.g., director and producer fields, actor and actress fields, etc. Still pictures may not need bit rate information. While some fields may be standard, others may be specific to certain applications. For example, a video signal may have secondary audio program (SAP) information in addition to other video-related metadata information.

The playlist records 208 contain information about each playlist available in the database 204, wherein the playlists are typically comprised of collections of media clips that may or may not be in any particular order. Users may choose to combine media by genre, mood, artists, directors/producers, audience, or any other meaningful arrangement. While the playlists on the server 110 will usually only include media clips contained in its own music database 204, it is also possible that the playlist records 208 may include multimedia clips or playlists stored on other servers, depending upon the implementation of the server-side media management system 200.

Figure 3:
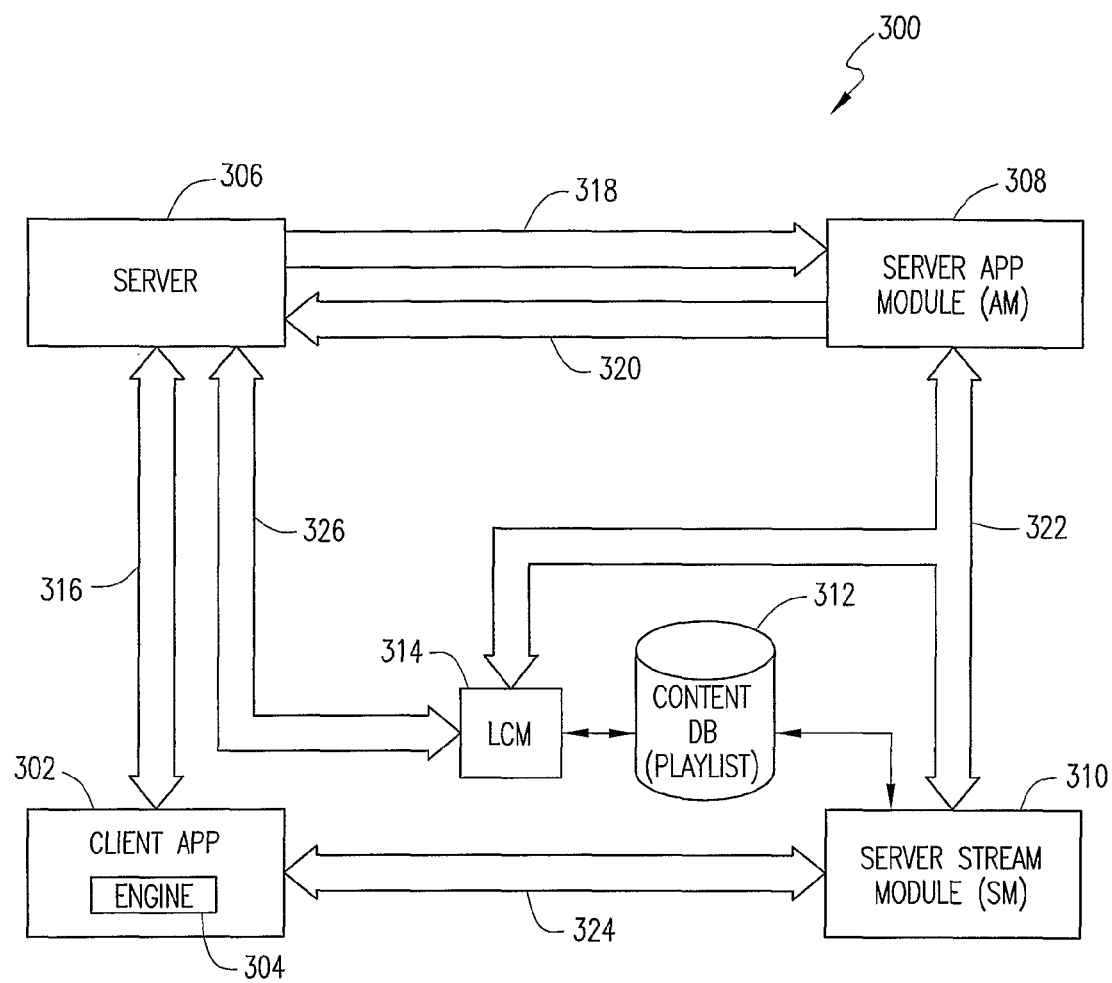
FIG. 3 depicts a block diagram of a client-server arrangement operable in a network environment for streaming digital multimedia content in accordance with an embodiment of the present invention.

FIG. 3 depicts a block diagram of an exemplary client-server arrangement 300 operable in a network environment for streaming digital multimedia content in accordance with an embodiment of the present invention, wherein the server-side architecture is distributed among a plurality of interoperable modules. Those skilled in the art should recognize that the client-server arrangement 300 is one illustrative implementation involving the server node 110 and a client device described hereinabove with respect to FIG. 1 and FIG. 2. A streaming client application 302 executing on any appropriate digital multimedia device is operable to interact with a web server 306 with respect to user requests and user feedback provided via path 316. Associated with the client application 302 is a media player engine 304, which may be embodied in software, hardware, firmware, or any combination thereof, for playing back the streaming media received over a streaming session. Web server 306 includes logic structure and functionality to invoke a presentation description by making a metadata file creation request 318 to a server application module (AM) 308 that generates a Session Description Protocol (SDP) file for a particular playlist. In general, a presentation description may describe one or more presentations, each of which maintaining a common time axis. A single presentation may contain several media streams whose description includes encoding information, language, and other parameters that enable the client application to choose the most suitable combination of media. Where multiple media streams are involved, it is possible that they may be located on different media servers; for example, audio and video streams can be split across servers for load sharing.

By way of example, a server streaming module (SM) 310, associated content database 312 and a local content manager (LCM) 314 are representative of a media server for streaming digital multimedia to the client player engine 304 via a real-time media delivery path 324 that is effectuated via a transport protocol such as Real-time Transport Protocol (RTP). Streaming events are notified to the server AM 308 by the streaming module via path 322 and streaming session status updates are provided by the server AM module 308 to the web server 306 via path 320. The web server 306 is operable to interact with the LCM via a path 326 with regard to playlist and media content management and playlist identifiers (e.g., Uniform Resource Locators or URLs).

As alluded to hereinabove, control over the delivery of data with real-time properties (i.e., digital multimedia) in the client-server arrangement 300 may be effectuated by an application-level text-based protocol such as RTSP which is operable to control multiple data delivery sessions, provide a means for choosing delivery channels such as User Datagram Protocol (UDP) channels, multicast UDP channels, etc., as well as provide a means for choosing data delivery mechanisms based upon RTP. Since the teachings of the present patent disclosure are particularly exemplified within the context of RTSP messaging, a brief description thereof is set forth immediately below.

RTSP establishes and controls one or more time-synchronized streams of continuous media such as audio and video, wherein the set of streams to be controlled is defined by a presentation description. There is no notion of an RTSP connection; instead, a server maintains a session typically labeled by an identifier. In general, an RTSP session is not tied to a transport-level connection such as the Transmission Control Protocol (TCP). During an RTSP session, an RTSP client application may open and close a number of TCP transport connections to the server to issue RTSP requests. Alternatively, it may use a connectionless transport protocol such as UDP.

A "presentation" is a set of one or more streams presented to the client as a complete media feed, using presentation description information. In most cases within the RTSP context, this implies aggregate control of those streams, but not necessarily so. A presentation description contains information about one or more media streams within a presentation, such as the set of encodings, network addresses and other information about the content. Other Internet Engineering Task Force (IETF) protocols such as SDP use the term "session" to describe a live presentation. The presentation description may take several different formats, including but not limited to the SDP-based session description format alluded to hereinabove.

The streams controlled by RTSP may use RTP for data delivery, but the operation of RTSP does not depend on the transport mechanism used to carry continuous media. RTSP's syntax and operation are similar to that of the more familiar Hypertext Transfer Protocol (HTTP), although several important distinctions between the two exist. For example, both an RTSP server and client can issue requests, whereas HTTP is an asymmetric protocol in which the client issues requests and the server responds. Also, with respect to RTSP, data is typically carried out-of-band by a different protocol (e.g., RTP). The following operations are supported by RTSP: (i) retrieval of media from a media server; (ii) invitation of a media server to a conference; and (iii) addition of media to an existing presentation.

In terms of overall operation, each presentation and media stream may be identified by an RTSP URL. For example, the RTSP UUL:

rtsp://media.example.com:554/twister/audiotrack identifies the audio stream within the presentation "twister", which can be controlled via RTSP requests issued over a TCP connection to port 554 of host <media.example.com>. As pointed out earlier, the presentation and the properties of the media are defined by a presentation description file, which may be obtained by a client application using HTTP or other means such as email and RTSP DESCRIBE requests, and may not necessarily be stored on the media server. The following table summarizes the RTSP method tokens that indicate the particular method to be performed on the resource identified in a request message:

TABLE I

| Method | Direction | Object |
| --- | --- | --- |
| DESCRIBE | Client (C) to Server (S) | Presentation (P); Stream (S) |
| ANNOUNCE | C to S; S to C | P; S |
| GET_PARAMETER | C to S; S to C | P; S |
| OPTIONS | C to S; S to C | P; S |
| PAUSE | C to S | P; S |
| PLAY | C to S | P; S |
| RECORD | C to S | P; S |
| REDIRECT | S to C | P; S |
| SETUP | C to S | S |
| SET_PARAMETER | C to S; S to C | P; S |
| TEARDOWN | C to S | P; S |

Each of these methods, whether applied on a single stream or a group of streams (i.e., a presentation), is typically provided with a number of header fields that are used for further defining the RTSP transactions in a client-server arrangement. Additional details regarding these and related RTSP requirements may be found in IETF Request for Comments (RFC) 2326, "Real Time Streaming Protocol (RTSP)" by Schulzrinne et al. (dated April 1998), which is incorporated by reference herein.

It should be appreciated that RTSP is versatile enough to provide for extensions, either by way of extending existing methods with new parameters or by defining new methods that are designed to impart enhanced functionality. As will be seen below, the present patent disclosure provides a new scheme that enables increased playlist seeking capabilities with respect to server-side playlists within a client-server arrangement such as, e.g., the arrangement 300 described above, by incorporating additional parameters in appropriate RTSP headers.

Figure 4:
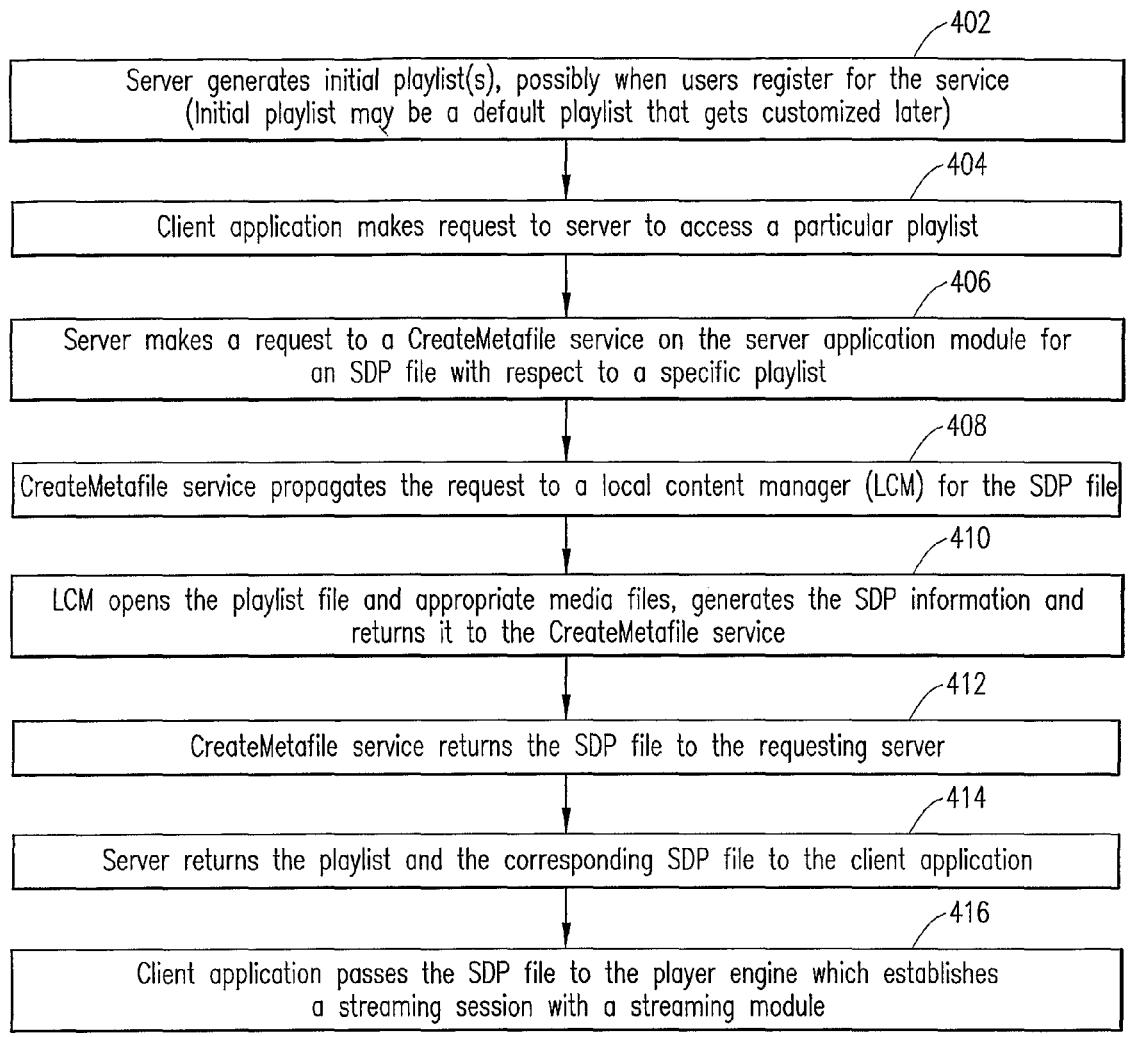
FIG. 4 is a flowchart of one aspect of operation with respect to the client-server arrangement shown in FIG. 3.

Referring now to FIG. 4, shown therein is a flowchart of one aspect of operation with respect to the client-server arrangement 300 shown in FIG. 3. The web server 306 is operable to generate initial playlists, possibly when users register for the service (block 402). In one implementation, the initial playlist may simply be a default playlist that gets customized later. The client application 302 makes a request to the web server 306 to access a particular playlist (block 404), whereupon the server 306 makes a request to a CreateMetafile service on the server application module 308 for an SDP file with respect to a specific playlist (block 406). The CreateMetafile service thereafter propagates the request to LCM 314 for the SDP file (block 408). Those skilled in the art should appreciate that the SDP file contains data that would have been obtained via an RTSP DESCRIBE request, as well as additional information, so the client application 302 does not have to issue a separate RTSP DESCRIBE request. Responsive to the SDP file, LCM 314 opens the playlist file and appropriate media file(s), generates the SDP information, and returns it to the CreateMetafile service (block 410) which passes the SDP file to the requesting web server 306 (block 412). Subsequently, the web server 306 returns the playlist (generated previously) and the corresponding SDP file to the client application 302 executing on the digital multimedia device (block 414). The client application 302 passes the SDP file to the player engine 304 which establishes a streaming session with the streaming module 310 for accepting the delivery of selected media (block 416). Where audio files are involved, for example, they may be encoded in a number of ways, such as Advanced Audio Coding (AAC), Windows® Media Audio (WMA), MP3, etc.

In a further variation, LCM 314 might not be involved in generating an SDP file. Instead, the CreateMetafile service makes a request directly to a streaming server (via RTSP DESCRIBE) to receive a base SDP description. Thereafter, the CreateMetafile service modifies the received SDP description to make it appropriate for client consumption. Additionally, the playlist file is not necessarily delivered to the client application along with the SDP file in all cases. In one embodiment where the client application understands the syntax of the playlist file, a playlist may be provided in addition to the SDP file, thereby allowing a much richer user experience and interaction with the client. In the case where the client may be totally unaware of playlists altogether, it would receive only an SDP file.

Figure 5:
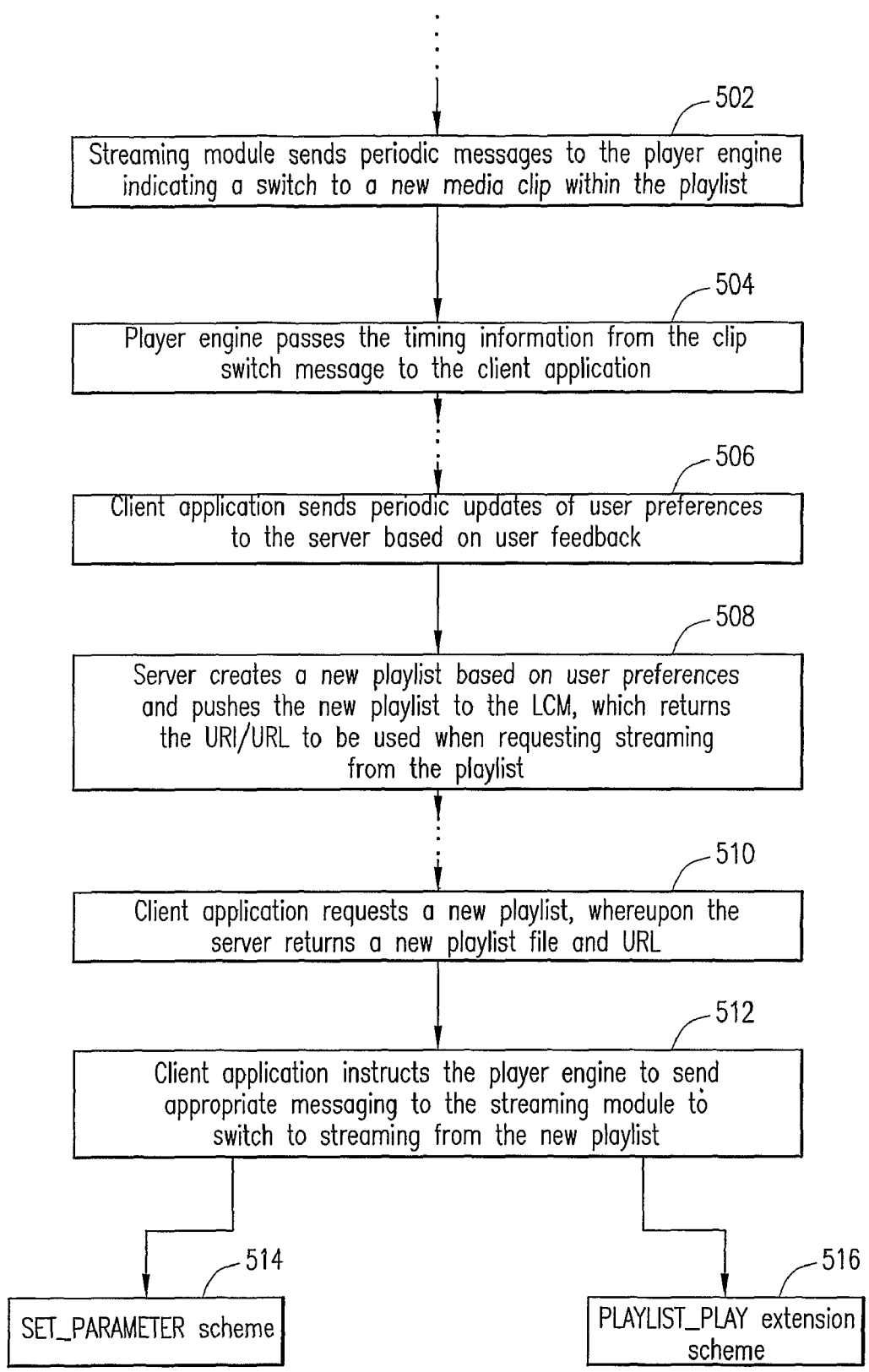
FIG. 5 is a flowchart of further aspects of operation with respect to the client-server arrangement shown in FIG. 3.

FIG. 5 is a flowchart of further aspects of operation with respect to the client-server arrangement shown in FIG. 3. The server-side streaming module 310 is operable to send periodic messages (e.g., SET_PARAMETER messages in RTSP) to the player engine 304, indicating a switch to a new media clip within a selected playlist or to a new playlist altogether (block 502). Responsive thereto, the player engine 304 passes the timing information in the clip switch messages to the client application 302 to coordinate media synchronization operations for display to the user (block 504). Additionally, the client application 302 may also send periodic updates of user preferences to the web server 306 based on user feedback (block 506). Responsive thereto, the web server 306 creates a new playlist based on user preferences and pushes the same to the LCM. Thereafter, the LCM returns the URL to be used when requesting streaming from this new playlist (block 508). In a further aspect, the client application 302 is operable to request streaming from a new playlist, whereupon the web server 306 returns the playlist URL and may optionally return a new playlist file as well (block 510). Responsive thereto, the client application 302 instructs the player engine 304 to send appropriate messaging to the streaming module 310 to switch to streaming from the new playlist (block 512). As illustrated in FIG. 5, two exemplary procedures may be implemented for effectuating server-side playlist switching: an RTSP SET_PARAMETER scheme which defines new additional parameters in a SET_PARAMETER message (block 514), and a PLAYLIST_PLAY extension scheme for the existing RTSP methodology (block 516). The PLAYLIST_LIST extension scheme is described in a related co-pending commonly assigned patent application Ser. No. 10/598,556 entitled "SYSTEM AND METHOD FOR RETRIEVING DIGITAL MULTIMEDIA CONTENT FROM A NETWORK NODE," filed even date herewith, which is incorporated by reference herein and will not be specifically elaborated in additional detail in the present patent disclosure. The SET_PARAMETER scheme which incorporates new additional parameters for controlling server-side content sources is set forth below in the following sections of the Detailed Description.

As pointed out previously, the digital multimedia content associated with a server-side network node may be organized into an arbitrary number of playlists, each including a number of media items or clips, wherein a media clip index determines the arrangement of the individual media items within a playlist. In a typical service scenario, users are able to subscribe to access a "channel" for playback. Initially, the user can select a channel according to categories such as mood or genre. Through periodic user feedback, the user's preferences may be updated and the channel becomes customized for each particular user.

Figure 6:
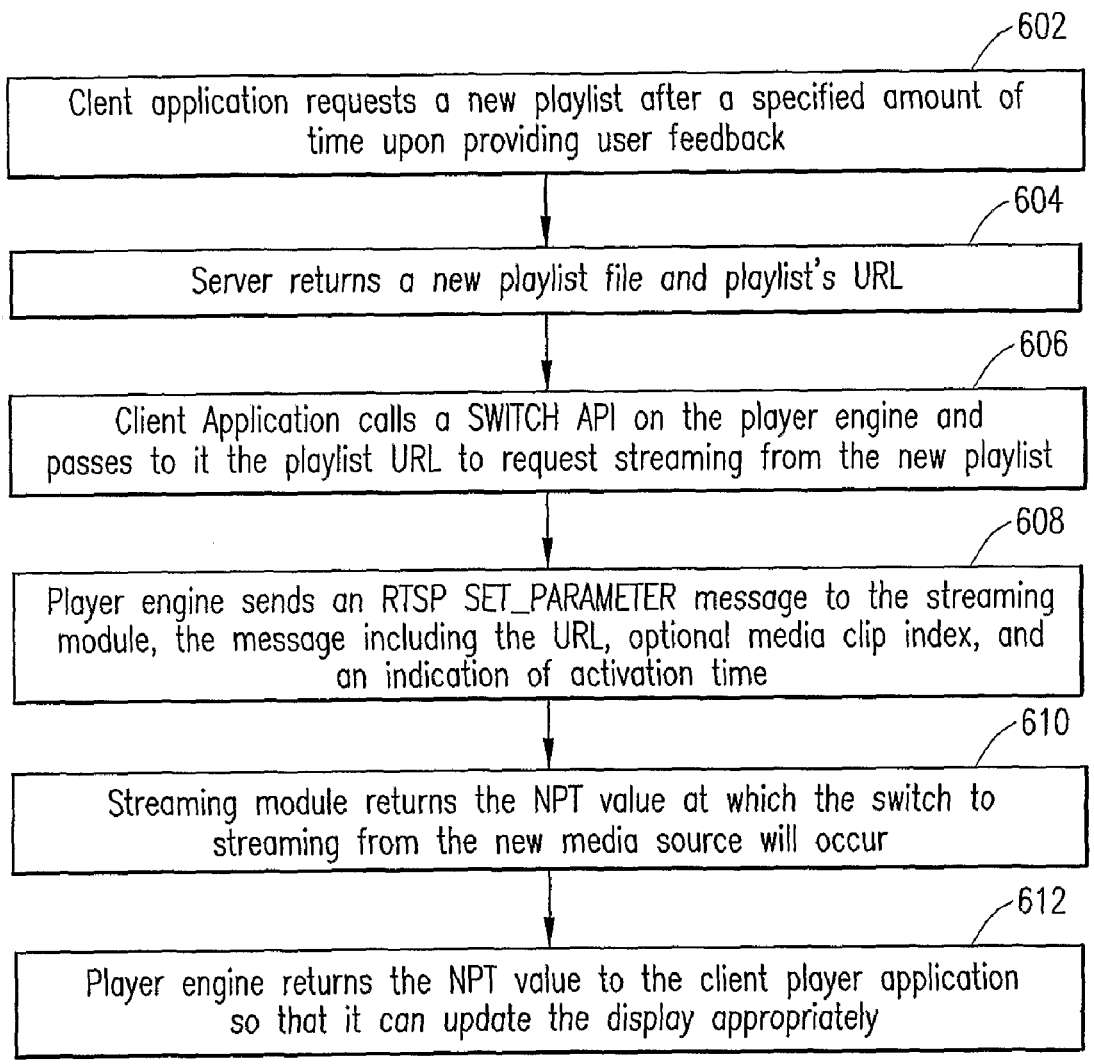
FIG. 6 is a flowchart of an exemplary SET_PARAMETER procedure for switching to a server-side playlist content source according to an embodiment of the present invention.

During normal playback, the server-side network node (i.e., the streaming module integrated or associated with a web server) is operable to seamlessly open each successive content source file in the playlist and continue streaming without interruption, which is seen by the player engine as a continuous RTP session. Referring to FIG. 6, shown therein is a flowchart of an exemplary SET_PARAMETER system and method for switching to a server-side playlist content source according to an embodiment of the present invention. A client application requests a new playlist after a specified amount of time upon providing periodic user feedback (block 602). The network node returns a new playlist metadata file and associated URL (block 604), similar to the some of the operational aspects described above in reference to FIG. 5. Thereafter, the client application is operable to call a suitable application programming interface (API)(e.g., a SWITCH playlist API) on the player engine and pass the playlist URL to it in order to request streaming from the new playlist (block 606). In response, the player engine transmits an RTSP SET_PARAMETER message the network node's streaming module, wherein the message includes the playlist URL, an optional media clip index and a clip offset, as well as an indication as to when switching should be activated (i.e., activation time or effective time) (block 608). The streaming module includes logic for returning a Normal Play Time (NPT) value determined based on the parameters received in the SET_PARAMETER message, wherein NPT value provides the time at which the switch to streaming from the new media source will occur (block 610). Upon receipt of the NPT value, the player engine passes it to the client player application so that the application can update the display appropriately (block 612).

FIG. 7 depicts request/response syntax structure associated with an exemplary SET_PARAMETER procedure according to an embodiment of the present invention. Reference numeral 702 refers to a client request in the form of SET_PARAMETER which includes the parameters <playlist_url>, <clip_index>, <clip_offset> and <activate>. The END OF CLIP indication associated with <activate> indicates that switching should take place at the end of the current clip (i.e., the one identified previously and currently streaming). Reference numeral 704 refers to a response from the streaming module to the player engine, which includes the parameters<playlist_url>, <clip_index>, <clip_offset> and <clip_ts>. The NPT value of 65000 associated with <clip_ts> is an exemplary normal play time value to which the END OF CLIP indication is mapped, which is eventually passed to the client player application. A SET_PARAMETER request 706 and associated client response 708 are effectuated pursuant to clip transition notification from the server side to the client.

Figure 8:
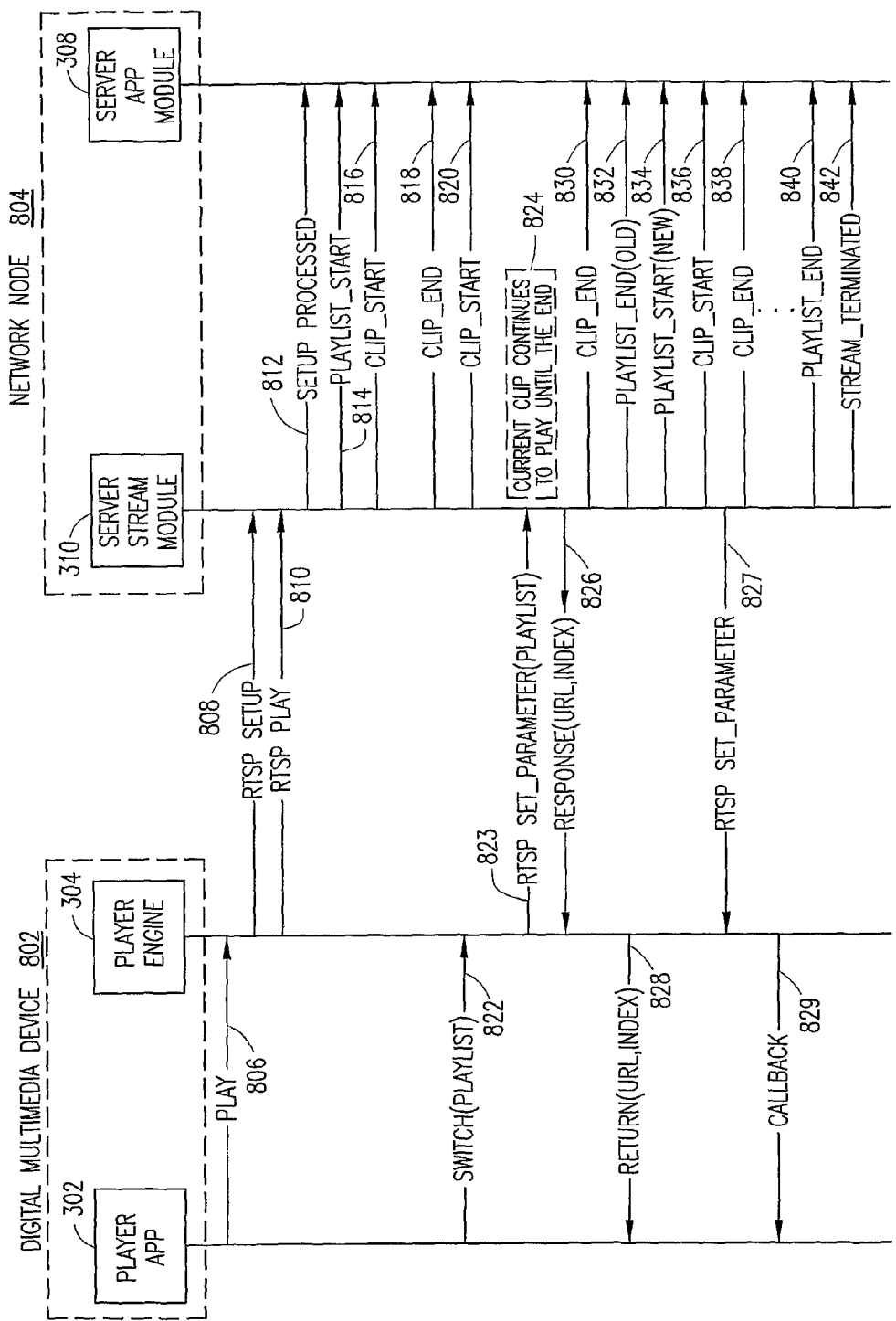
FIG. 8 depicts a message flow diagram associated with an embodiment for retrieving digital multimedia content from a network node.

FIG. 8 depicts a message flow diagram associated with an embodiment for retrieving digital multimedia content from a network node using the SET_PARAMETER procedure set forth above. By way of illustration, exemplary media retrieval is effectuated by skipping on-the-fly to a new media clip or to new server-side playlist (i.e., dynamic playlist updating or switching). Client player application 302 and associated player engine 304 are generalized into a digital multimedia device 802 which is disposed in a client-server arrangement with a generalized server-side network node 804 that includes streaming module 310 as well as server application module 308. Upon propagating a PLAY message 806 from the player application 302 to its player engine 304 (via suitable application program interfacing), an RTSP SETUP message 808 is generated to the streaming module 310. Relatedly, an RTSP PLAY message 810 is transmitted to the streaming module 310 by the player engine 304, which then effectuates a streaming data delivery session therebetween. As illustrated, a number of streaming events are reported back to the server application module 308 by the streaming module 310. Event 812 indicates that SETUP is processed, whereupon events such as PLAYLIST_START 814, CLIP_START 816, and CLIP_END 818 are subsequently propagated to indicate the streaming of particular media clip. At the end of a clip, the streaming module uninterruptedly transitions to streaming from the next clip in the previously identified content source, as indicated by a new CLIP_START 820 event.

While streaming from the current media clip is continuing, a SWITCH message 822 is generated by the client player application 302 which includes the new content source parameters as described above. Responsive thereto, an RTSP SET_PARAMETER message 823 is propagated by the player engine 304 to the streaming module 310 of the network node 804 to indicate dynamic playlist updating or switching. Depending on specific implementational details, streaming from the current clip can continue until the end or may be terminated substantially immediately upon receiving another RTSP SET_PARAMETER message with a <clip> parameter from the player engine 304. As illustrated in FIG. 8, the current clip is indicated to continue to play until the clip boundary is reached (block 824). In the meantime, a response message 826 including an NPT value is generated by the network node 804 in response to the first SET_PARAMETER request 823, which is passed to the player application 302 as a RETURN message 828 that includes the requested playlist's URL, clip index as well as the NPT value.

Upon reaching the boundary of the current clip, a CLIP_END event 830 is notified to the server application module 308. Subsequently, an event 832 notifying the termination of the previous playlist is propagated. Events 834 and 836 notify that streaming from a new content source, i.e., the requested playlist and the particular media clip therein, is commenced. An RTSP SET_PARAMETER request 827 from the stream module 310 to the player engine 304 and a subsequent CALLBACK message 829 from the player engine 304 to the player application 302 are provided for effectuating clip transition notification. Upon reaching the end of the new media clip, as indicated by CLIP_END 838, the streaming module continues to stream from the next clip in the new playlist. This process continues until the playlist is ended, as indicated by PLAYLIST_END 840. As the streaming session is terminated, a STREAM_TERMINATED event 842 is notified accordingly.

Those skilled in the art will recognize that the SET_PARAMETER requests to effectuate dynamic switching may contain an indication to skip to a new clip in the current playlist, switch to a new playlist, or skip to a specific clip in a new playlist, or to an offset within a clip. As seen in the foregoing discussion, the behavior of the server node's streaming module is governed by the presence of various appropriate header parameters in the RTSP request. The playlist URL header indicates the URL from which to stream, and according to one implementation, it may be required in all requests to ensure synchronicity between the server and the corresponding client, regardless of whether the request is to skip to a new clip within the same playlist. If the clip index header is missing, a default treatment may be provided such that the streaming module switches to the first clip of the requested playlist. As to the activation time indication, possible values may be NOW (switch immediately), END OF CLIP (at the end of the current clip), or END OF PLAYLIST (at the end of the current playlist). In yet another implementation, the activation time may assume any value based on a clock.

In a further implementation, if the streaming module receives successive playlist update requests that do not get fulfilled immediately, the last request received is the one that gets executed. That is) any prior requests that have not been fulfilled will be overridden. In an exemplary scenario, consider that the streaming module is streaming clip C4 from playlist P2, and it receives a playlist update request for P3 to take effect when C4 is done. But before C4 has completed, the streaming module receives another request to skip back to clip C3 in playlist P1 immediately. Since the first request has not yet been satisfied, the second request overrides the previous playlist update request (which would take effect only after streaming from C4 is done). Thus, the streaming module immediately switches to playlist P1 and starts streaming from clip C3.

In a still further example, consider that the streaming module is streaming from clip C4 from playlist P2, and it receives a playlist update request for P3. But before C4 is done, the streaming module receives another request to update to playlist P4. Both of these requests are to take effect at the end of the current clip, i.e., C4 in playlist P2. Since the former request to switch to playlist P3 has not yet been satisfies, the streaming module will start streaming from the first clip (C1) in playlist P4 when clip C4 in playlist P2 is completed.

Based on the foregoing Detailed Description, it should be appreciated that the present patent disclosure advantageously provides the ability for a streaming client application to request a streaming server node to dynamically navigate within or across a playlist boundary, either in the form of skipping to a media source within the same playlist or from another playlist file, or to an offset within a clip. Further, such navigation is possible in an exemplary client-server network arrangement regardless of the underlying streaming architecture (e.g., RealMedia, Windows Media, QuickTime, et cetera). Moreover, it should be recognized that the teachings of the present disclosure may be practiced in conjunction with other client/server protocols such as Session Initiation Protocol (SIP), H.323, etc.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method for retrieving digital multimedia content from a network node, comprising: generating a Real Time Streaming Protocol (RTSP) SET_PARAMETER message to said network node by a client application executing on a digital multimedia device, said message containing at least one of a playlist identifier, a media clip index and a clip offset as well as an indication of an activation time corresponding to an END OF CLIP value; and transferring digital multimedia content to said digital multimedia device by said network node from a second content source identified by at least one of said playlist identifier and said media clip index, wherein said RTSP SET_PARAMETER message is generated in response to the client application generating a SWITCH message while said network node is streaming current digital multimedia content to said digital multimedia device from a first content source different than and physically separate from the second content source wherein the first content source and the second content source are not located within the same device and, wherein the first content source comprises a first media clip from a first playlist from which said current media multimedia content is accessed for streaming and the second content source comprises a second media clip from a second playlist from which said digital multimedia content of the second content source is accessed for streaming, wherein said network node continues to stream from the first media clip until a boundary of the first media clip is reached and wherein said transferring commencing in response to the boundary of the second media clip being reached during said streaming thereof, further comprising receiving a Normal Play Time (NPT) value determined based on the parameters received in the SET_PARAMETER message, wherein the NPT value indicates a time at which streaming of media content from the second media clip will commence, and further comprising causing the time to be displayed after receiving the NPT and wherein the first playlist is a list of multiple media clips that the first content source can stream and the second playlist is a list of multiple media clips that the second content source can stream and the first media clip and the second media clip contain different content.

2. The method for retrieving digital multimedia content from a network node as recited in claim 1, wherein said digital multimedia device accesses said network node over at least one of a wireline network, a wireless network, and a cable network.

3. The method for retrieving digital multimedia content from a network node as recited in claim 1, wherein said digital multimedia device comprises at least one of: a digital music player, a digital video player, a computer, and a handheld communications device enabled to accept streaming media.

4. A system for retrieving digital multimedia content from a network node, comprising: means associated with a client application executing on a digital multimedia device for generating a Real Time Streaming Protocol (RTSP) SET_PARAMETER message to said network node, said message containing at least one of a playlist identifier, a media clip index and a clip offset as well as an indication of an activation time corresponding to an END OF CLIP value; and means for transferring digital multimedia content to said digital multimedia device by said network node from a second content source identified by at least one of said playlist identifier and said media clip index, wherein said RTSP SET_PARAMETER message is generated in response to the client application generating a SWITCH message while said network node is streaming current digital multimedia content to said digital multimedia device from a first content source different than and physically separate from the second content source wherein the first content source and the second content source are not located within a same device and, wherein the first content source comprises a first media clip from a first playlist from which said current media multimedia content is accessed for streaming and the second content source comprises a second media clip from a second playlist from which said digital multimedia content of the second content source is accessed for streaming, wherein said network node continues to stream from the first media clip until a boundary of the first media clip is reached and wherein said transferring commencing in response to the boundary of the second media clip being reached during said streaming thereof, further comprising means for receiving a Normal Play Time (NPT) value determined based on the parameters received in the SET_PARAMETER message, wherein the NPT value indicates a time at which streaming of media content from the second media clip will commence, and further comprising means for causing the time to be displayed after receiving the NPT and wherein the first playlist is a list of multiple media clips that the first content source can stream and the second playlist is a list of multiple media clips that the second content source can stream and the first media clip and the second media clip contain different content.

5. The system for retrieving digital multimedia content from a network node as recited in claim 4, wherein said digital multimedia device accesses said network node over at least one of a wireline network, a wireless network, and a cable network.

6. The system for retrieving digital multimedia content from a network node as recited in claim 4, wherein said digital multimedia device comprises at least one of: a digital music player, a digital video player, a computer, and a handheld communications device enabled to accept streaming media.

7. A digital multimedia device operable to retrieve digital multimedia content from a network node, comprising: a processor executing logic for generating a Real Time Streaming Protocol (RTSP) SET_PARAMETER message to said network node by a client application executing on said digital multimedia device, said message containing at least one of a playlist identifier, a media clip index and a clip offset as well as an indication of an activation time corresponding to an END OF CLIP value; and a player engine operable to play back streaming content from a second content source identified by at least one of said playlist identifier and said media clip index, said streaming content from the second content source commencing at a time determined responsive to said indication of said activation time, wherein said RTSP SET_PARAMETER message is generated in response to the client application generating a SWITCH message while said network node is streaming current digital multimedia content to said digital multimedia device from a first content source different than and physically separate from the second content source wherein the first content source and the second content source are not located within a same device and, wherein the first content source comprises a first media clip from a first playlist from which said current digital multimedia is accessed for streaming and the second source comprises a second media clip from a second playlist from which said multimedia content of the second content source is accessed for streaming, wherein said network node continues to stream from the second media clip until a boundary of the second media clip is reached, wherein the client application continues to receive said multimedia content being streamed from the first media clip until a boundary of the second media clip is reached, and causing the client application continue to begin receiving said multimedia content from the first media clip in response to the boundary of the first media clip being reached during said streaming thereof, further comprising the client application being configured to receive a Normal Play Time (NPT) value determined based on the parameters received in the SET_PARAMETER message, wherein the NPT value indicates a time at which streaming of media content from the second media clip will commence, and further comprising the client application being configured to cause the time to be displayed after receiving the NPT and wherein the first playlist is a list of multiple media clips that the first content source can stream and the second playlist is a list of multiple media clips that the second content source can stream and the first media clip and the second media clip contain different content.

8. The digital multimedia device operable to retrieve digital multimedia content from a network node as recited in claim 7, further comprising means for accessing said network node over at least one of a wireline network, a wireless network, and a cable network.

* * * * *